Aug. 23, 1966 C. C. HEPKER 3,268,650

VERTICAL COMPONENT MOUNTING MEANS

Filed Sept. 14, 1965

INVENTOR.
CASS C. HEPKER

BY Marvin Moody

ATTORNEY

United States Patent Office 3,268,650
Patented August 23, 1966

3,268,650

VERTICAL COMPONENT MOUNTING MEANS

Cass C. Hepker, Cedar Rapids, Iowa, assignor to Collins Radio Company, Cedar Rapids, Iowa, a corporation of Iowa Filed Sept. 14, 1965, Ser. No. 487,218
7 Claims. (Cl. 174—15)

This invention relates in general to mounting devices and in particular to a new and novel apparatus and method for mounting electrical components.

It is oftentimes desirable to mount electrical components close together on a holding board such that they are firmly attached and damped from vibration.

The present invention provides a novel mounting device which is inexpensive and capable of allowing large quantities of components to be mounted on a circuit board or plate.

It is an object of this invention, therefore, to provide an improved mounting device for electrical components.

A feature of this invention is found in the provision for a flexible component holder that may be inserted into an opening in a holding board and which is formed with an opening through which a mounting pin extends to deform the holder thus locking it in the board and providing a clamping action on a component.

Further features, objects and advantages of this invention will become apparent from the following description and claims when read in view of the accompanying drawings, in which:

Figure 1:
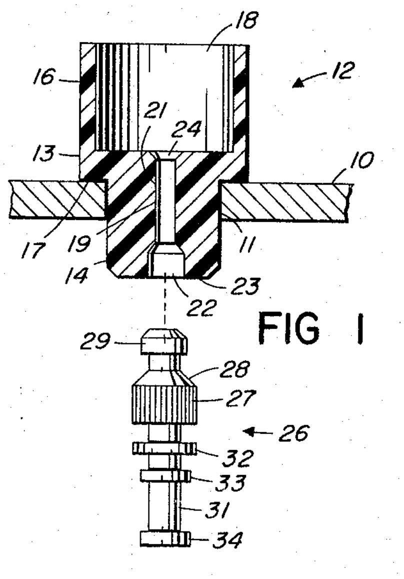
FIGURE 1 is an exploded sectional view of the mounting device according to this invention.

FIGURE 1 illustrates a mounting board 10 which is formed with an opening 11 in which it is desired to install the mounting device of this invention. The board 10 might be a chassis or metallic terminal plate or it might alternatively be a printed circuit board and might be made of insulating material. Although it is shown as being of metal, it is not to be limited to such material. A mounting device designated generally as 12 comprises a first portion 13 which is made of an insulating flexible material such as Teflon or polyethylene and has a first cylindrical portion 14 which extends through the opening 11 in the mounting plate 10. The upper portion 16 of the mounting insert 13 is hollow and has a larger diameter than portion 14. A shoulder 17 is formed which rests against one side of the plate 10. The upper portion 16 is hollow to form a cavity 18 in which a component can be inserted. An axial opening 19 is formed within the mounting portion 13 and has a central portion 21 which is smaller than the portion of hole 22 adjacent the end 23. Likewise, the hole 21 is bevelled adjacent its upper edge 24 where it enters the cavity 18. An insert 26 of a suitable metal as, for example, beryllium copper, is formed with an enlarged knurled portion 27 which has a tapered shoulder 28 and which has an enlarged portion 29 adjacent its upper end relative to FIGURE 1. A mounting post 31 is formed at the other end of the insert and a shoulder 32 is formed by enlarging a portion of the insert. Enlargements 33 and 34 are also formed on the mounting post 31 to facilitate connecting leads to the insert 26.

Figure 2:
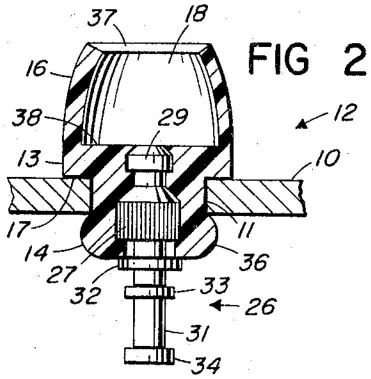
FIGURE 2 is a sectional view of the holding device of this invention with the insert in the component holding portion thus locking the units to a mounting board.

As best shown in FIGURE 2, the insert 26 is inserted into the flexible mounting member 13 by inserting the flexible mounting portion 13 through the opening 11 to the position shown in FIGURE 1 and by then pushing insert 26 into the opening 19 and pressing it to the position shown in FIGURE 2. As the insert is pressed into the flexible mounting 13 it causes the portion 14 below the plate 10 to cold flow, thus forming an enlarged portion 36 which is larger than the opening 11 in plate 10. This firmly attaches the mounting device to plate 10 so that the enlarged portion 36 and the shoulder 17 lock the mounting device to the plate 10. The knurled portion 27 of the insert deforms the flexible mounting portion 13 since it is larger than the opening 19. The portion 29 is smaller than the portion 27 but is large enough to deform the mounting device 13 above plate 10 relative to FIGURE 2, so as to cause the walls of the upper portion 16 to curve inwardly. This provides a cavity 18 in which the top 37 is smaller than the bottom 38. It is to be noted that the shoulder 32 of the insert 26 limits the upward motion of the insert and that the flexible material of part 13 flows between the enlargement 27 and the shoulder 32 to firmly lock the insert into the Teflon material.

Figure 3:
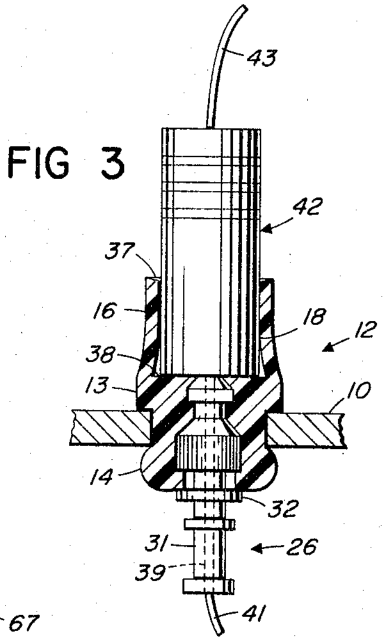
FIGURE 3 illustrates a component mounted in the mounting device.

As best shown in FIGURE 3 a component such as a resistor may then be mounted in the mounting device 12. The insert 26 is formed with an axial opening 39 through which a lead 41 of a component 42 may be inserted. The other lead 43 of the component extends upwardly. The lead 41 may be bent around the mounting post 31 of the insert 26 to make electrical connection with the mounting post 31. Other leads, not shown, may be connected to the mounting post by wrapping and/or suitable soldering techniques.

As the component 42 is inserted into the cavity 18 of the flexible mounting member 16 it causes the walls which are deformed as shown in FIGURE 2, to spread and firmly clasp the walls of the component until the portion 16 assumes the position shown in FIGURE 3. This results in the material adjacent the top opening 37 of the mount being expanded and being under tension so as to firmly clamp component 42. However, the component may easily be pressed into flexible holder with the lead 41 extending through the opening in the insert 26.

The mounting device shown in FIGURE 1 through 3 provides a firm mount for an electrical component which allows high density of components to be mounted to a board and provides vibration damping of the component due to the tension in the holding portion 16 which firmly clasps the component. A very neat arrangement results which minimizes the chance of shorting out of component leads. The upper lead 43 of component 42 is of course connected in a conventional manner to other portions of the circuitry.

Figures 4, 5:
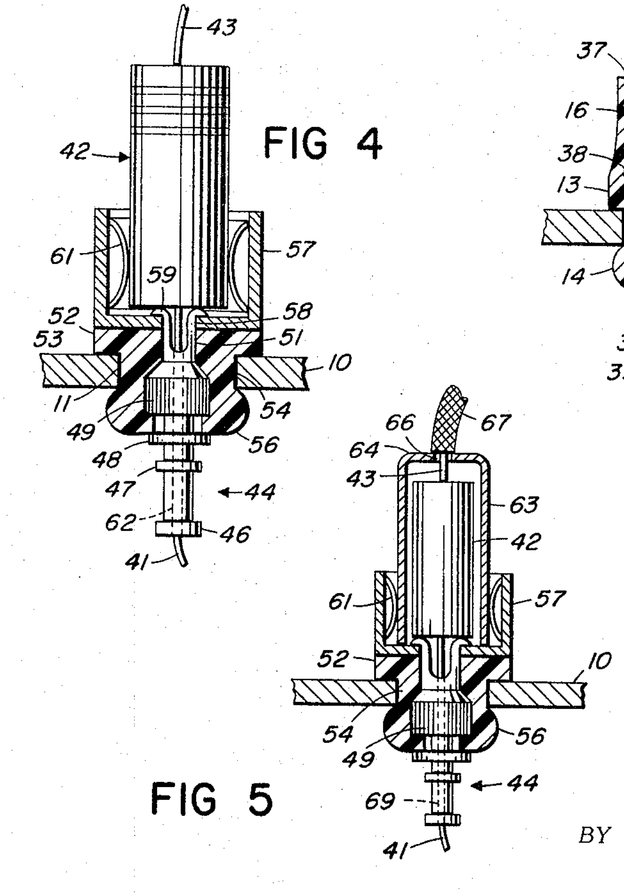
FIGURE 4 illustrates a modification of the invention which includes a heat sink; and, FIGURE 5 shows an additional modification with a heat sink for a component and a radio frequency shield.

A modification of the invention is illustrated in FIGURE 4 in which a component 42 is to mounted in a heat sink such that its temperature may be reduced by drawing heat from the component. An insert 44 with shoulders 46, 47 and 48 is formed with an enlarged knurled portion 49 and a split sleeve 51 at its upper end. A flexible portion 52 is formed with an enlarged portion 53 and a smaller portion 54. The portion 54 is inserted through the opening 11 of the plate 10 and the insert 44 is inserted by pushing it through the flexible portion 52. This causes the portion below the plate 10 relative to FIGURE 4 to deform forming a large portion 56 which firmly locks the flexible portion 52 to the plate 10. A metallic cup member 57 is attached to the flexible portion 52 and is formed with an opening 58 through which the split sleeve portion 51 extends. The split sleeve 51 is upset to form locking lugs 59 within the sleeve 57 to firmly lock the sleeve 57 to the insert 44.

Mounted within the sleeve 57 is an annular spring member 61. The component 42 is inserted into the sleeve 57 and engages the spring 61. The spring and sleeve are made of metallic heat conducting material. The spring makes good contact with the outer walls of the component 42 and heat is withdrawn from the component. The lead 41 extends through a central opening 62 of the insert 44. Thus the heat produced in component 42 will pass into spring 61 and to the metallic sleeve 57 where it will be removed by radiation and convection.

The spring 61 comprises a split annular member curved so as to produce spring action against the walls of the sleeve 57.

FIGURE 5 illustrates the same structure as shown in FIGURE 4 in which a shielding cylinder 63 surrounds the component 42. The shielding cylinder 63 has an open end which is received and clamped between spring 61 in the sleeve 57. The upper end 64 of the cylinder 63 is formed with an opening 66 through which lead 43 extends. A shielded conductor 67 is attached to the end 64 and covers the lead 43 to shield it to prevent radio frequency interference.

It is seen that this invention provides an apparatus and method for mounting components to a holding board such that they are damped from vibration.

Although this invention has been described with respect to particular embodiments thereof, it is not to be so limited, as changes and modifications may be made therein which are within the spirit and scope of the invention as defined by the appended claims.

I claim:

1. Apparatus for mounting a component to a board formed with an opening comprising; an insert formed with an enlarged portion, a flexible member formed with a sleeve and a second smaller portion with an axial opening received in the opening in said board and extending through said board, said insert received in the axial opening of the smaller portion and expanding the smaller portion on the side of the board opposite said sleeve so as to lock the flexible member to the board, the end of the sleeve remote from said board being deformed radially inwardly by the insert to form a sleeve with a larger inside opening near the board than exists at the end remote from the board, said component having a cross section substantially conforming to and smaller than the smaller inside opening of said sleeve and said component being received in and frictionally retained by said sleeve.

2. In apparatus according to claim 1 an axial opening formed through the insert and an axially extending electrical lead from said component extending therethrough.

3. Apparatus for mounting a component to a plate formed with an opening comprising a flexible member formed with an enlarged hollow sleeve portion and a smaller portion with an axial opening with the smaller portion extending through the opening in the plate, an insert formed with a pair of enlarged portions received in the axial opening of the smaller portion of the flexible member and expanding said smaller portion radially so as to lock said flexible member to the plate, one of the enlarged portions of the insert deforming the sleeve portion of the flexible member on the side of the plate opposite that of said smaller portion to cause the sleeve opening remote from said plate to be smaller than the sleeve opening adjacent said plate, said component having a cross section substantially conforming to and less than the smaller sleeve opening, said component being received in and frictionally retained by said sleeve portion.

4. In apparatus according to claim 3, an opening formed through the insert, and an axially extending electrical lead from said component extending therethrough.

5. Means for mounting a component to a plate having a hole formed therethrough comprising; a flexible member formed with an enlarged diameter sleeve portion and a smaller diameter portion, said smaller diameter portion extending through the hole in said plate, an insert formed with an enlarged diameter portion, an axial opening formed through the smaller portion of said flexible member, said insert inserted in the opening in the smaller diameter portion of said flexible member and expanding the smaller diameter portion of said flexible member radially outwardly on the side of the plate opposite said sleeve portion to lock said flexible member to said plate, a heat sink attached to the enlarged diameter portion of said flexible member, said heat sink comprising a hollow metallic cup the base of which adjoins said flexible member and has formed therethrough an axial hole, said insert having an axial hole extending therethrough and having one end thereof communicating with said cup member base and affixed thereto in coaxial alignment, spring means affixed within said cup member, said component received within said cup member in confining engagement with said spring means, and an axially extending electrical lead from component extending through the holes in said cup member base and said insert.

6. In apparatus according to claim 5 a shield can receivable within the heat sink cup member and confined between said spring means and said component to provide a radio frequency shield for the component.

7. In apparatus according to claim 5 wherein said spring means is annular.

References Cited by the Examiner

UNITED STATES PATENTS

| | | | |
|---|---|---|---|
| 2,358,491 | 9/1944 | Del Camp | 174—35 |
| 3,095,470 | 6/1963 | Dozier | 174—166 X |

FOREIGN PATENTS

| | | |
|---|---|---|
| 669,041 | 3/1952 | Great Britain. |

LARAMIE E. ASKIN, *Primary Examiner.*